United States Patent [19]
Faraj

[11] Patent Number: 5,697,624
[45] Date of Patent: Dec. 16, 1997

[54] CART FOR TRANSPORTING GROCERY BAGS AND CARTONS

[76] Inventor: Abdul-Razzak Faraj, 3481 Lakeside Dr. Apt 2806, Atlanta, Ga. 30326

[21] Appl. No.: 541,143

[22] Filed: Oct. 11, 1995

[51] Int. Cl.⁶ .................................................. B62B 1/00
[52] U.S. Cl. ............................ 280/47.19; 280/47.32
[58] Field of Search ...................... 280/47.17, 47.18, 280/47.19, 645, 47.24, 47.26, 47.28, 47.29, 47.32, 47.315, 47.3, DIG. 3, 652, DIG. 4, 78; 248/97, 98

[56] References Cited

U.S. PATENT DOCUMENTS

| | | | |
|---|---|---|---|
| 4,523,773 | 6/1985 | Holtz | 280/47.29 |
| 4,830,385 | 5/1989 | Wallick et al. | 248/98 |
| 5,464,104 | 11/1995 | McArthur | 280/47.19 |

FOREIGN PATENT DOCUMENTS

| | | | |
|---|---|---|---|
| 298317 | 10/1915 | Germany | 280/47.3 |
| 83820 | 11/1920 | Switzerland | 280/47.3 |
| 9756 | of 1892 | United Kingdom | 280/47.3 |
| 553294 | 5/1943 | United Kingdom | 280/47.3 |

*Primary Examiner*—Richard M. Camby
*Attorney, Agent, or Firm*—John L. James

[57] ABSTRACT

A cart is provided for transporting bags, cartons and other containers of groceries or other items from the point of purchase. The cart has a support member with a top and bottom end portions and a middle portion intermediate the top and bottom end portions. A wheel is resiliently mounted on the bottom end portion of the support member and a handle is attached to the top end portion of the support member. A plurality of hooks are positioned on the middle portion of the support member for receiving handles of bags of groceries or other items and supporting the bags for transport. A foldable bracket on the middle portion of the support member below the hooks for supports a container, such as a carton of soft drinks or bag of animal food.

15 Claims, 1 Drawing Sheet

CART FOR TRANSPORTING GROCERY BAGS AND CARTONS

FIELD OF THE INVENTION

The present invention relates generally to a hand cart, and, more particularly, to a hand cart for transporting bags and other containers of food from a grocery facility.

BACKGROUND OF THE INVENTION

Grocery shopping is a chore that is done regularly. At the check out counter bags, boxes, cartons and other containers of groceries and supplies are typically loaded into a four wheel grocery cart for transport to a shopper's automobile where the groceries are removed from the cart and loaded into the automobile. The empty cart is then returned to a designated area. Four wheeled carts requiring the use of both hands are often cumbersome to use and returning them to a designated area is often a chore. It is desirable to have a simple cart for transporting groceries that is easy to use and that a shopper can own to eliminate the chore of returning a cart to a designated area.

In many instances, grocery shopping is not done using a personal automobile, but is done using public transportation or by foot. In these instances, shoppers rely on baskets and two wheeled carts into which purchased items are placed for transport from the grocery store to their residences. Unfortunately, baskets are small limiting the amount of groceries transported, and two wheeled carts present a storage problem when not in use. Also, many two wheeled carts form a cage or basket into which the grocery containers are stacked one on top of another causing the bottom container to be crushed thereby damaging the goods. Accordingly, it will be appreciated that it would be highly desirable to have a compact shopping cart that holds a large supply of groceries without stacking the grocery bags on top of each other, and that is easy to store when not in use. It is also desirable to have a shopping cart that can be carried on buses and subway trains while loaded with groceries.

SUMMARY OF THE INVENTION

The present invention is directed to overcoming one or more of the problems set forth above. Briefly summarized, according to one aspect of the present invention, a cart comprises a support member having top and bottom end portions with a middle portion intermediate the top and bottom end portions, a wheel mounted on the bottom end portion of the support member, a handle attached to the top end portion of the support member, and a plurality of hooks on the middle portion of the support member with each hook of the plurality of hooks being positioned for receiving a handle of a container and supporting the container.

Including a foldable bracket on the middle portion of the support member below the plurality of hooks provides a supporting platform a container, particularly a container without handles such as a soft drink carton or container of pet food. Hingedly connecting the bracket to the support member allows the bracket to move between a closed, storage position at which the bracket rests against the support member and an open, work position at which the bracket extends from the support member to provide a supporting platform.

To aid conservation and recycling efforts, a storage compartment located in the support member above the plurality of hooks provides a convenient place to store reusable bags for carrying goods. A compartment door secures and nearly retains the bags in the storage compartment until needed.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
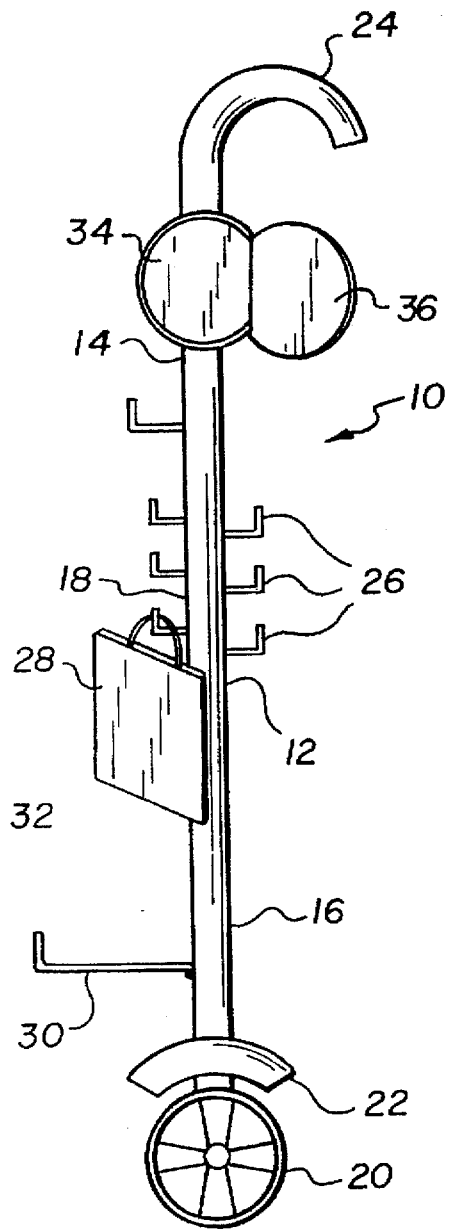
FIG. 1 is a diagrammatic side view of a preferred embodiment of a cart according to the present invention with a bracket extended for holding a carton and with a storage compartment door open.
Figure 2:
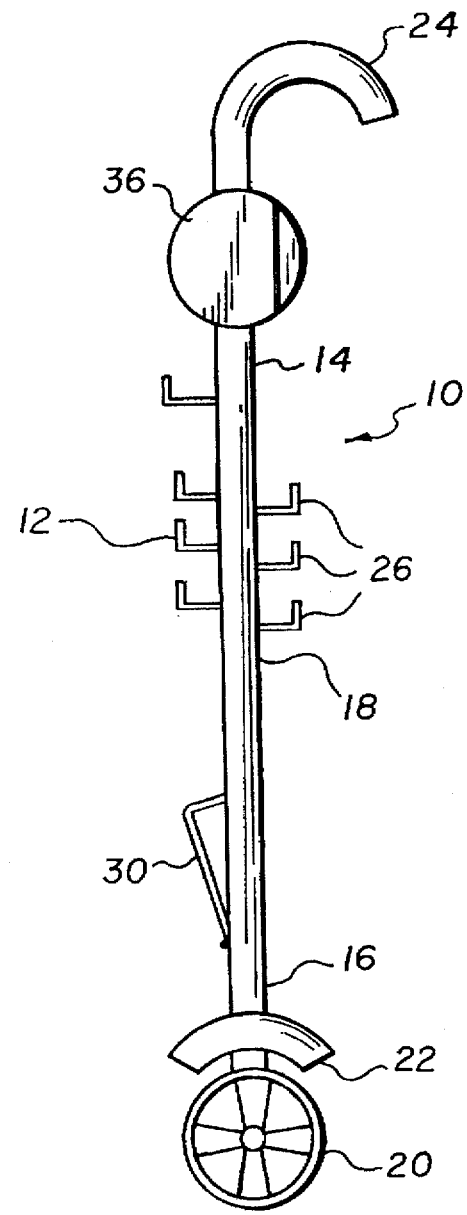
FIG. 2 illustrates the cart of FIG. 1 with the door closed and bracket folded in toward the support member of the cart.

Referring to FIGS. 1–2, a cart 10 for transporting groceries and other items has a support member 12 with a top end portion 14, a bottom end portion 16 and a middle portion 18 intermediate the top and bottom end portions 14, 16. The support member 12 is preferably constructed of hollow metal or plastic about three to five inches wide but can be constructed of metal or plastic tubing.

A wheel assembly 20 is mounted on the bottom end portion 16 of the support member 12. The wheel assembly 20 may contain a rigidly mounted pneumatic tire, but a resiliently mounted tire is preferred for smooth movement. A spring or shock absorber 22 may be used to provide the desired resiliency. The wheel 20 preferably pivots for easy maneuverability. While only a single wheel is required, dual wheels can be used and will give the cart the ability to stand alone while unattended.

A handle 24 attached to the top end portion 14 of the support member 12 is used by a shopper to hold the cart upright when in use and to steer the cart. Steering is accomplished using only one hand while the other hand remains free. The handle 24 is preferably a curved handle similar to the handle of an umbrella or walking cane. The combination of the curved handle 24 and single wheel 20 make the cart 10 easy to maneuver and thus well suited for shoppers of various ages and abilities.

A plurality of U-shaped or J-shaped hooks 26 are located on the middle portion 18 of the support member 12. Each of the hooks 26 is positioned for receiving a handle or handles of a first container 28, such as a bag, and supporting the container 28. The hooks 26 are preferably located around the entire periphery of the support member 12 but may be located only on the sides of the support member 12 to allow more space for the shopper to walk behind the cart 10. The hooks 26 are spaced so that individual containers 28 are not stacked atop one another or crowded against one another to thereby protect the merchandise in the containers from damage.

A bracket 30 hingedly connected to the middle portion 18 of the support member 12 below the plurality of hooks 26 is provided for supporting a second container 32, such as a carton of soft drinks or bag of pet food or other container without handles. The hinged bracket 30 is moveable between a closed, storage position at which the bracket 30 rests against the support member 12 and an open, work position at which the bracket 30 extends from the support member 12. Alternatively, at the closed, storage position, the bracket 30 may be folded alongside the support member without actually contacting the support member. At the open, work position, the bracket 30 is preferably perpendicular to the support member 12. Preferably, the bracket 30 is spring loaded to automatically return the bracket to the closed storage position when not in use. The bracket 30 is preferably of about equal width with the support member 12, but may be wider to provide more support for wide loads. Also, an upturned lip on the distal end of the bracket 30, along with straps wrapped about the container and support member, keeps containers positioned on the bracket.

Many shoppers use reusable bags as a conservation effort. A storage compartment 34 located in the support member 12 above the plurality of hooks 26 is useful for storing bags until needed. The storage compartment 34 may be fitted with a door 36 to secure the contents of the storage compartment.

It can now be appreciated that a cart for transporting grocery bags and cartons has been presented. The cart has a support member with a top end portion, a bottom end portion and a middle portion intermediate the top and bottom end portions. A single, pivotal wheel is resiliently mounted on the bottom end portion of the support member. A curved handle is attached to the top end portion of the support member for one handed control of the cart. Hooks on the middle portion of the support member receive handles bags and support the bags of groceries. A folding support bracket on the middle portion of the support member below the hooks supports containers without handles. The bracket folds against the support member for storage. A storage compartment with a door provides a convenient place for storing bags.

The cart is a compact shopping cart that holds a large supply of groceries without having to stack the grocery bags on top of each other. The cart is easy to use and stores easily when not in use. The shopping cart that can be carried on buses and other public conveyances while loaded with groceries. Because the cart is a simple one wheeled cart that is easy to manufacture, it is affordable so that a shopper can own a cart and thereby eliminate the tedious chore of returning a store owned cart to a designated area.

While the invention has been described with particular reference to the preferred embodiments, it will be understood by those skilled in the art that various changes may be made and equivalents may be substituted for elements of the preferred embodiments without departing from invention. For example, the hooks may be integrally formed on the support member or may be mechanically attached. Also, the storage compartment can be made to have a larger dimension than the support member for added storage capacity. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. For example, a fender may be added to the wheel for aesthetic effect and to prevent water or slush from soiling the shopper. It is accordingly intended that the claims shall cover all such modifications and applications as do not depart from the true spirit and scope of the invention.

What is claimed is:

1. A cart, comprising:

a support member having a top end portion, a bottom end portion and a middle portion intermediate said top and bottom end portions;

a storage compartment in said support member;

a wheel mounted on said bottom end portion of said support member;

a handle attached to said top end portion of said support member;

a plurality of hooks on said middle portion of said support member, each hook of said plurality of hooks being positioned for receiving a handle of a first container and supporting said container; and a bracket on said middle portion of said support member below said plurality of hooks for supporting a second container.

2. A cart, as set forth in claim 1, wherein said bracket is hingedly connected to said support member.

3. A cart, as set forth in claim 1, wherein said bracket is moveable between a closed, storage position at which said bracket rests against said support member and an open, work position at which said bracket extends from said support member.

4. A cart, as set forth in claim 3, wherein said bracket is perpendicular to said support member at said work position.

5. A cart, as set forth in claim 1, wherein said storage compartment lies above said plurality of hooks.

6. A cart, as set forth in claim 1, including a door to said storage compartment.

7. A cart, as set forth in claim 1, including shock absorbing means for mounting said wheel on said support member.

8. A cart for transporting groceries and other items, comprising:

a longitudinally extending support member having a top end portion, a bottom end portion and a middle portion intermediate said top and bottom end portions;

a storage compartment in said support member;

a wheel mounted on said bottom end portion of said support member;

a handle attached to said top end portion of said support member;

a plurality of hooks on said middle portion of said support member for receiving handles of first containers of said groceries and other items and supporting said containers; and a bracket on said middle portion of said support member below said plurality of hooks for supporting a second container.

9. A cart, as set forth in claim 8, wherein said bracket is hingedly connected to said support member.

10. A cart, as set forth in claim 8, wherein said bracket is moveable between a storage position at which said bracket rests against said support member and a work position at which said bracket extends from said support member.

11. A cart, as set forth in claim 10, wherein said bracket is perpendicular to said support member at said work position.

12. A cart, as set forth in claim 8, wherein said storage compartment lies above said plurality of hooks.

13. A cart, as set forth in claim 8, including a door to said storage compartment.

14. A cart, as set forth in claim 8, including shock absorbing means for mounting said wheel on said support member.

15. A cart, comprising:

a support member having a top end portion, a bottom end portion and a middle portion intermediate said top and bottom end portions;

a wheel mounted on said bottom end portion of said support member;

a handle attached to said top end portion of said support member;

a plurality of hooks on said middle portion of said support member, each hook of said plurality of hooks being positioned for receiving a handle of a first container and supporting said container.

a bracket hingedly connected to said middle portion of said support member below said plurality of hooks for supporting a second container, said bracket being moveable between a closed, storage position at which said bracket rests against said support member and an open, work position at which said bracket extends from said support member;

a storage compartment in said support member above said plurality of hooks; and a door to said storage compartment.

* * * * *